Patented Dec. 12, 1939

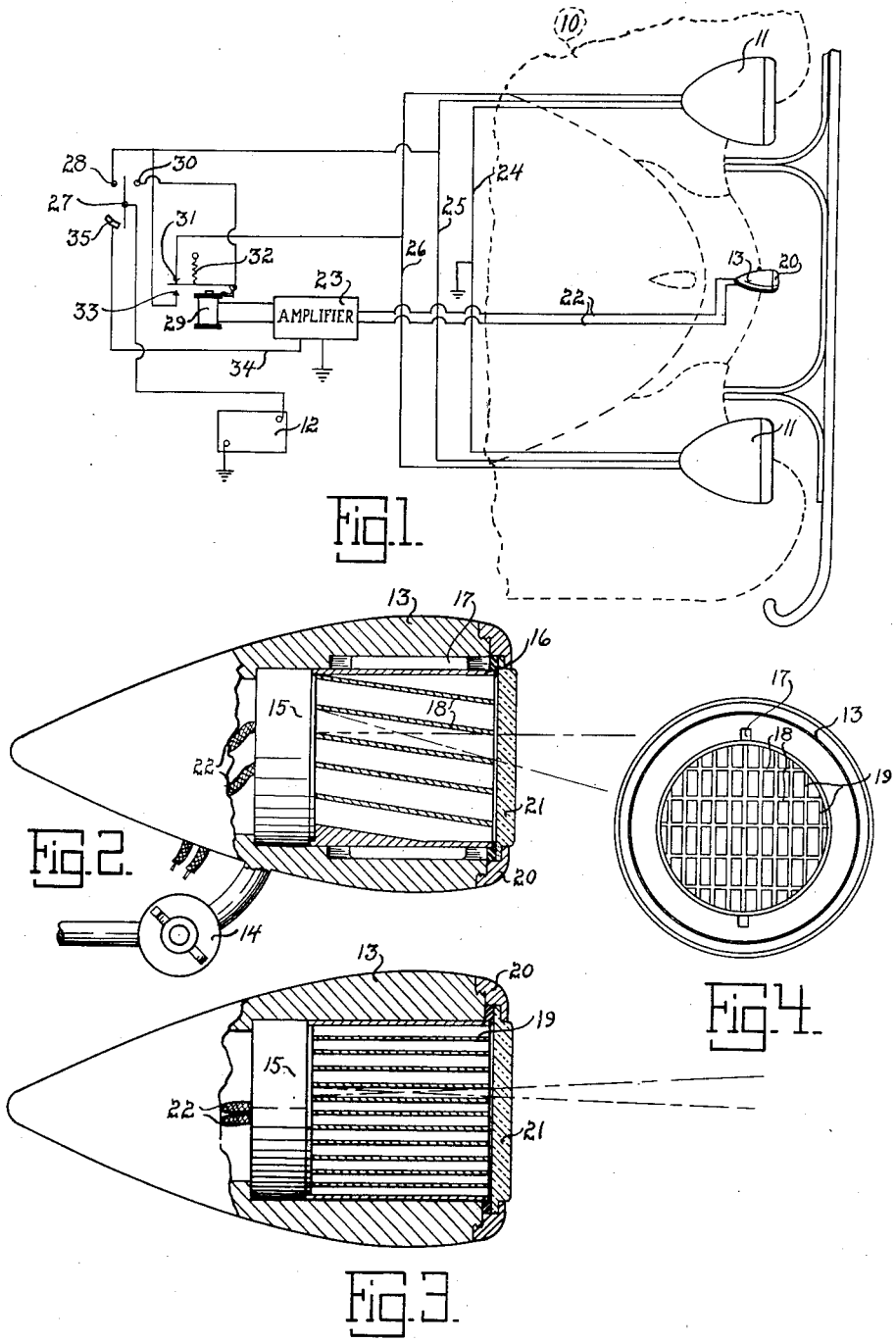

2,182,987

UNITED STATES PATENT OFFICE 2,182,987

HOUSING FOR LIGHT-SENSITIVE CELL OR THE LIKE

Lloyd N. Hopkins, Storm Lake, Iowa

Application April 2, 1938, Serial No. 199,691

1 Claim. (Cl. 250—41.5)

The principal object of this invention is to provide a means for automatically deflecting or dimming vehicular headlights that will automatically cause the lights of the vehicle, to which the device is attached, to dim or be deflected when the device is exposed to the headlight beams of an approaching vehicle.

A further object of my invention is to provide a means for automatically deflecting or dimming vehicular headlights that will always be operatively connected in the lighting circuit of the vehicle when the switch is in a position for turning on bright lights.

A still further object of my invention is to provide a means for automatically deflecting or dimming vehicular headlights that will receive the light rays from approaching headlights within a defined limit of arc actuating the mechanism and thereby causing the headlights of the vehicle to which the device is attached to be automatically deflected preventing the blinding of the oncoming driver.

A still further object of my invention is to provide a means for automatically deflecting or dimming vehicular headlights that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claim, and illustrated in the accompanying drawing, in which:

Fig. 1 is a top diagrammatic plan view of my device installed on an automotive vehicle and ready for use.

Fig. 2 is an enlarged side plan view of the photo-electric cell casing showing the arrangement of the horizontal controlling vanes.

Fig. 3 is an enlarged top sectional view of the photo-electric cell casing showing the arrangement of the vertical vanes therein.

Fig. 4 is an enlarged front plan for the photo-electric cell casing with the lens cover removed and more fully illustrating its construction.

One of the principal causes of accidents on the highways is the bright glare from the headlights of approaching vehicles. Although most states have laws requiring that lights be dimmed upon approaching another vehicle, the drivers are careless in this respect and often-times need to concentrate on the control of the car rather than the dimming of the headlights. The dimming or deflecting of headlights is now accomplished through ordinary switches either of the hand operated or foot operated type. These are unsatisfactory due principally to the fact that the dimming operation may be neglected by the driver and also it is necessary to deviate from the absolute control of the car in order to accomplish the dimming or deflecting of the headlight rays.

I have overcome such disadvantages as will be appreciated and as will be more fully set forth.

Referring to the drawing, I have used the numeral 10 to designate a vehicle of the common type having on its forward end the usual headlights 11. These headlights, in common practice, have electric bulbs therein comprising a high filament and a low filament. In conjunction with a lens glass, one of the filaments causes the light rays to be deflected downwardly and another filament causes the light rays to be deflected upwardly for giving the greatest possible range of illumination. I have used the numeral 12 to designate the storage battery or like source of electric energy common in vehicles, which has one of its terminals grounded as shown.

It is to such a vehicle that I attach my automatic light deflecting means which I will now describe.

The principal portion of my device is the photo-electric casing which is shown in Figures 2, 3, and 4 of the drawing. The numeral 13 designates the casing of my device which is secured to the forward end portion of the vehicle 10 through the medium of an adjustable rod 14 for controlling the angle of inclination of the casing 13. Secured within the casing 13 at a distance from its forward open end is a common photo-electric cell 15 which is of the common light-sensitive type energized by light impulses as it is commonly known. The numeral 16 designates a cylinder capable of being placed within the case or shell 13. The numeral 17 designates lugs extending outwardly from the cylinder 16 for slidably engaging the slots cut in the inner walls of the case 13 as shown in Figure 13 for aligning the cylinder 16. Rigidly secured within the cylinder 16 is a plurality of vanes 18 extending horizontally across the cylinder and sloping downwardly toward the front of the cylinder for preventing certain light rays from being impressed on the photo-electric cell 15. These vanes 18 provide a sharp cutoff at a horizontal level and permit a greater deviation of light rays to enter from a level lower than the horizontal. The angle of reception of light rays is shown by the broken lines Figure 2. In common practice these vanes are painted a dull absorbing black to prevent refraction or reflection of stray light rays on to the photo-electric cell. I have used the numeral 19 to designate the vanes extending vertically within the cylinder 16 and intersecting the vanes 18. These vanes control the horizontal angle from which light rays can be received by the photo-electric cell 15. This angle of control is indicated by the broken lines in Figure 3 and in practice would be plotted so as to receive light beams within an angle of approximately eight degrees at a distance of five hundred feet. These vanes will be painted or colored a dull absorbing black. I have used the numeral 20 to designate a ring or cap which may be threaded on to the forward end of the shell 13. The numeral 21 designates a transparent lens, retained by the ring 20, and extending over the forward end of the cylinder 16, as shown in Figures 2 and 3 for protecting the device against the elements. I have used the numeral 22 to designate the electric lead lines from the photo-electric cell 15. These lead lines have their other ends electrically connected to a photo-electric cell amplifier 23. I have used the numerals 24, 25, and 26 to designate the electric lead lines of the headlights 11. These wires are connected in parallel with respect to the two headlights and the wire 24 is grounded and serves as the common or center lead to the headlight bulbs. The wire 25 is connected with the filament which dims the headlight or deflects them downwardly and the wire 26 is in electric communication with the bright filaments of the headlight bulbs. I have used the numeral 27 to designate a switch normally placed within the driver's compartment of the vehicle and having its switch arm in electrical communication with the open terminal of the battery 12. I have used the numeral 28 to designate one of the contact points of this switch which is an electrical communication with the wire 25. The numeral 29 designates a two way relay having its magnetic winding in electrical communication with the out-put of an amplifier. The operating arm of the relay 29 is an electrical communication with the contact point 30 of the electric switch. The numeral 31 indicates a contact point in electrical communication with the wire 26 completing the circuit from the contact point 30 to the wire 26 when the relay 29 is not energized, by virtue of the spring 32. The numeral 33 designates a contact point on the relay in electric communication with the wire 25, for electrically connecting the wire 25 to the contact point 30. When the relay 29 is energized, one side of the amplifier input is grounded. The numeral 34 indicates an electric lead line having one end in communication with the input of the amplifier 23 and has one end in communication with a plate 35 of the switch. The switch arm 27 is in contact with this plate 35 at the same time it is in contact with the contact point 30.

The practical operation of my device is as follows: The shell 13 is secured to the forward end of the vehicle 10, the rod 14 is adjusted so that the vanes 18 will prevent light rays above a certain angle from being received by the photo-electric cell which is wired into the circuit through the wire 22 as shown. In practice the vanes 18 would be so positioned so as to eliminate all light rays above a horizontal plane from being impressed on the photo-electric cell but would cover a considerable field below the horizontal in order that the photo-electric cell would be actuated upon meeting an approaching vehicle on the top of a hill or like. The vanes 19 would be so positioned as to allow for a confined angle of arc from which light will be received in a horizontal plane. In actual practice, the vanes 19 would be so plotted as to accommodate only lighted objects normally confined within a roadway or the like. These vanes 18 and 19 prevent the photo-electric cell from being actuated by foreign light sources such as street lamps, lighted buildings or the like.

When the lights of the vehicle are turned off, the photo-electric amplifier 23 will be turned off. When the switch arm 27 is in contact with the contact point 28, the dimmed or downwardly deflected lights will be lighted and, as there is no need of further dimming, the photo-electric cell unit will not function. When the switch arm 27 is rotated to a point where it is in contact with the point 30, it will also contact the plate 35 which causes the amplifier 23 to be energized at the same time the bright lights are turned on. The bright lights are normally held in electric connection through the arm of the relay 29 and the relay point 31. However, when light rays are impressed, within the arc of reception, on the photo-electric cell 15, electric impulses are set up which will amplify in the amplifier 23 and provide enough current to operate the relay 29. The relay 29 pulls the arm downwardly against the tension of the spring 32 automatically connecting the source of power through the switch arm 27 and contact point 30, to the wire 25 which deflects the headlights downwardly or dims them. As soon as the photo-electric cell 15 ceases to be energized by the rays of light of an oncoming vehicle, the spring 32 will again pull the arm of the relay 29 upwardly and into electric contact with the point 31 which will automatically cause the headlights to switch to their bright filament.

Thus it will be seen that I have provided a means for automatically deflecting or dimming vehicular headlights that is automatic and foolproof in its function, that causes the headlights to be dimmed without necessitating any action on the part of the driver and one which fulfills all of my objects.

Some changes may be made in the construction and arrangement of my improved means for automatically deflecting or dimming vehicular headlights without departing from the real spirit and purpose of my invention, and it is my intention to cover by my claim, any modified forms of structure or use of mechanical equivalents which may be reasonably included within its scope.

I claim:

In a casing for a light-sensitive cell for receiving light rays within a given angle forward of the light-sensitive cell, a shell casing having one of its ends open, a light-sensitive cell in said casing, a plurality of vertical vanes in said casing between said light-sensitive cell and the open end of said casing, and a plurality of horizontal vanes in said casing between said light-sensitive cell and the open end of said casing; said horizontal vanes sloping forwardly and downwardly for limiting the height of vertical reception of light rays by said light-sensitive cell.

LLOYD N. HOPKINS.